United States Patent
Steen et al.

(10) Patent No.: US 7,229,383 B2
(45) Date of Patent: Jun. 12, 2007

(54) METHOD FOR CONTROLLING A CLUTCH COUPLING VIA A BRAKE CONTROL AND A DEVICE FOR THE SAME

(75) Inventors: Marcus Steen, Angered (SE); Anders Eriksson, Gothenburg (SE)

(73) Assignee: Volvo Lastvagnar AB, Gothenburg (SE)

( * ) Notice: Subject to any disclaimer, the term of this patent is extended or adjusted under 35 U.S.C. 154(b) by 112 days.

(21) Appl. No.: 10/904,017

(22) Filed: Oct. 19, 2004

(65) Prior Publication Data

US 2005/0049110 A1  Mar. 3, 2005

Related U.S. Application Data

(63) Continuation of application No. PCT/SE03/00610, filed on Apr. 15, 2003.

(30) Foreign Application Priority Data

Apr. 19, 2002 (SE) .................................... 0201209

(51) Int. Cl.
*F16D 48/06* (2006.01)
(52) U.S. Cl. ....................................................... 477/74
(58) Field of Classification Search .................. 477/71, 477/74
See application file for complete search history.

(56) References Cited

U.S. PATENT DOCUMENTS

| 5,393,274 | A | 2/1995 | Smedley |
| 5,632,706 | A | 5/1997 | Remmling et al. |
| 5,700,227 | A * | 12/1997 | Kosik et al. ................. 477/171 |
| 6,071,211 | A | 6/2000 | Liu et al. |
| 6,086,508 | A | 7/2000 | Kosik et al. |
| 6,346,064 | B1 * | 2/2002 | Hada et al. .................. 477/171 |
| 6,676,562 | B1 * | 1/2004 | Bulgrien ....................... 477/74 |
| 2001/0049576 | A1 | 12/2001 | Wheeler et al. |

* cited by examiner

*Primary Examiner*—Dirk Wright
(74) *Attorney, Agent, or Firm*—Novak Druce + Quigg, LLP

(57) ABSTRACT

Method and arrangement for controlling a clutch coupling (3) via a brake control (17). The primary function of the clutch coupling (3) is to transmit motive force from an internal combustion engine (1) arranged in a vehicle to an automatic stage-geared gearbox (9) that is arranged in the vehicle, and in which the primary function of the brake control (17) is to control service brakes (16) of the vehicle. The method and the device are characterized in that at zero throttle opening, with a low gear engaged and no brake force required, a control function is activated in which the clutch coupling (3) is controlled via the brake control (17).

9 Claims, 2 Drawing Sheets

METHOD FOR CONTROLLING A CLUTCH COUPLING VIA A BRAKE CONTROL AND A DEVICE FOR THE SAME

CROSS-REFERENCE TO RELATED APPLICATIONS

The present application is a continuation patent application of International Application No. PCT/SE03/00610 filed Apr. 15, 2003 which was published in English pursuant to Article 21(2) of the Patent Cooperation Treaty, and which claims priority to Swedish Application No. 0201209-4 filed 19 Apr. 2002. Said applications are expressly incorporated herein by reference in their entireties.

TECHNICAL FIELD

The present invention relates to a method for a brake pedal-controlled clutch coupling that is arranged in a motor vehicle to transmit motive force from an internal combustion engine to a gearbox.

BACKGROUND OF THE INVENTION

Automatic gearboxes of the automatic stage-geared gearbox type have become ever more common in heavier vehicles with the increasing development of microprocessor systems. This makes it possible, with a control computer and a number of control devices, such as servomotors, for example, to precisely regulate the engine speed, engagement and disengagement of an automatic clutch coupling between engine and gearbox, and gearbox clutch members in relation to one another, so that smooth gear changes are always achieved at the correct engine speed. The advantage with this type of automatic gearbox compared to a conventional automatic gearbox made up of planetary gear trains and having a hydrodynamic torque converter on the input side lies partly in the fact that it is more simple and robust, and can be manufactured at substantially lower cost than the conventional automatic gearbox, especially where used in heavy vehicles, and partly in that it affords greater efficiency, which means the possibility of reduced fuel consumption.

A stage-geared gearbox usually comprises (includes, but is not necessarily limited to) an input shaft, an intermediate shaft, that has at least one toothed gear meshing with a toothed gear on the input shaft, and a main shaft with toothed gears, which mesh with toothed gears on the intermediate shaft. The main shaft is then further connected to an output shaft coupled to the driving wheels via a prop shaft, for example. Each pair of toothed gears has a different gear ratio from another pair of gears in the gearbox. Different transmission ratios are obtained in that different pairs of gears transmit the torque from the engine to the driving wheels.

The development of computer technology has also had an impact on electronic control and feedback systems for a vehicle engine, and these systems have become more precise, faster and more adaptable to prevailing engine and environmental conditions. The entire combustion process can be precisely controlled according to any operating situation. The vehicle's throttle lever (an accelerator pedal, for example), which primarily controls the fuel supply to the engine, controls the vehicle's engine via electrical wiring and electronic signals. The throttle lever is therefore equipped with sensors for detecting the throttle lever position, that is to say what throttle opening is required.

The brake system in heavier vehicles is often a combined electronic and pneumatic system. A brake control unit controls modulators (relay valves) by means of electrical signals. The modulators control the air flow to the various brake cylinders on the vehicle. The system is primarily controlled by a brake control, usually a brake pedal. The brake pedal is equipped with sensors for detecting the brake control position, that is to say what brake force is required.

An automatic clutch coupling of the aforementioned type is usually controlled by means of information on the throttle lever position, the engine speed, the engine output torque and the position of the clutch coupling. The control parameter for the clutch position and hence for the degree of engagement between the engine and the gearbox primarily depends on how the driver positions the throttle lever.

When driving heavy vehicles, situations sometimes arise in which the vehicle needs to be driven at low speeds in a low gear with high transmission ratio engaged and the throttle lever fully eased off, that is to say the driver of the vehicle does not require fuel to the engine but wishes the vehicle to be driven at idling speed by means of the vehicle's low-idle speed control. Since the throttle lever is fully eased off at such low speeds, the driver of the vehicle lacks the speed-control function of the vehicle afforded by the throttle lever when he/she wishes to reduce speed further. When the lowest gear is engaged, the only possibility open to the driver is to use the brake control and hence the service brakes in order to further reduce the speed of the vehicle. In braking the vehicle to such an extent that the engine speed is reduced to less than the idling speed, however, the vehicle transmission control unit will normally ensure that the engine is isolated from the gearbox, so that the engine is not throttled to the point that it stalls. There is therefore no scope for the driver to continuously regulate the speed of the vehicle at these low speeds.

There is therefore a need, in the case of vehicles equipped with automatic stage-geared gearboxes and in precisely controlled driving at speeds lower than can be achieved in the lowest vehicle gear and at the engine idling speed, to find a way of controlling the speed of the vehicle. This is a primary object of the invention described below.

SUMMARY OF THE INVENTION

The means of achieving the object of the invention in respect of the method and the device according to the invention.

The method according to the invention relates to the control of a clutch coupling via a brake control, in which the main function of the clutch coupling is to transmit motive force from an internal combustion engine arranged in a vehicle to an automatic stage-geared gearbox arranged in the vehicle, and in which the main function of the brake control is to control the service brakes of the vehicle. The method is characterized in that at zero throttle opening, with a gear engaged and no brake force required, a control function is activated in which the said clutch coupling is controlled via the brake control.

The device according to the invention relates to a brake control-regulated clutch coupling for transmitting motive force from an internal combustion engine arranged in a vehicle to an automatic stage-geared gearbox arranged in the vehicle, the device comprising a brake control for controlling the service brakes of the vehicle, a control unit having at least a brake control function and a clutch coupling control function, a brake control position sensor, a throttle lever position sensor for a throttle lever arranged on the vehicle and gear position sensors, all of the said position sensors being coupled to the control unit. The device is characterized in that the control unit is designed, at zero throttle opening, with a gear engaged and no brake force required, to activate a control function for controlling the said clutch coupling via the brake control.

The advantage of the method and the device according to the invention is that they afford the driver the facility for driving the vehicle at speeds which are lower than are normally possible at idling speed with the lowest gear having the highest transmission ratio engaged. In precisely controlled driving at low speed, the driver of a vehicle with an automatic stage-geared gearbox engaged can control the speed of the vehicle with greater precision and in a more controlled manner via the brake control compared to the prior art. Since the speed in such situations is so low that the throttle lever is entirely eased off, the driver has the facility to reduce, and if so required, to continuously control the speed of the vehicle further in that the clutch coupling is controlled as a function of the position of the brake control.

According to an advantageous second embodiment of the method and the arrangement according to the invention, the clutch coupling is controlled via the brake control only over a predefined first operating range, the first operating range representing a smaller part of the overall operating range of the brake control. When the driver depresses the brake control past the first operating range, the brake control assumes control of the service brakes of the vehicle and the vehicle can be braked in the known way.

The advantage of this is that in the first operating range of the brake control the driver can isolate the engine from the gearbox to varying degrees, so that more or less motive force is transmitted from the engine to the driving wheels and the vehicle can thereby be driven at speeds which are normally too low for the engine idling speed and the lowest gear available on the vehicle. When the vehicle needs to be brought to a standstill, the brake control is depressed further past the first operating range and the vehicle brakes are activated, providing the braking action in the known way as a function of the position of the brake control.

BRIEF DESCRIPTION OF THE DRAWINGS

The present invention will be further explained below with reference to the drawings attached, which show, via example, preferred embodiments of the invention and the prior art.

DESCRIPTION OF PREFERRED
EMBODIMENTS OF THE INVENTION

Figure 1:
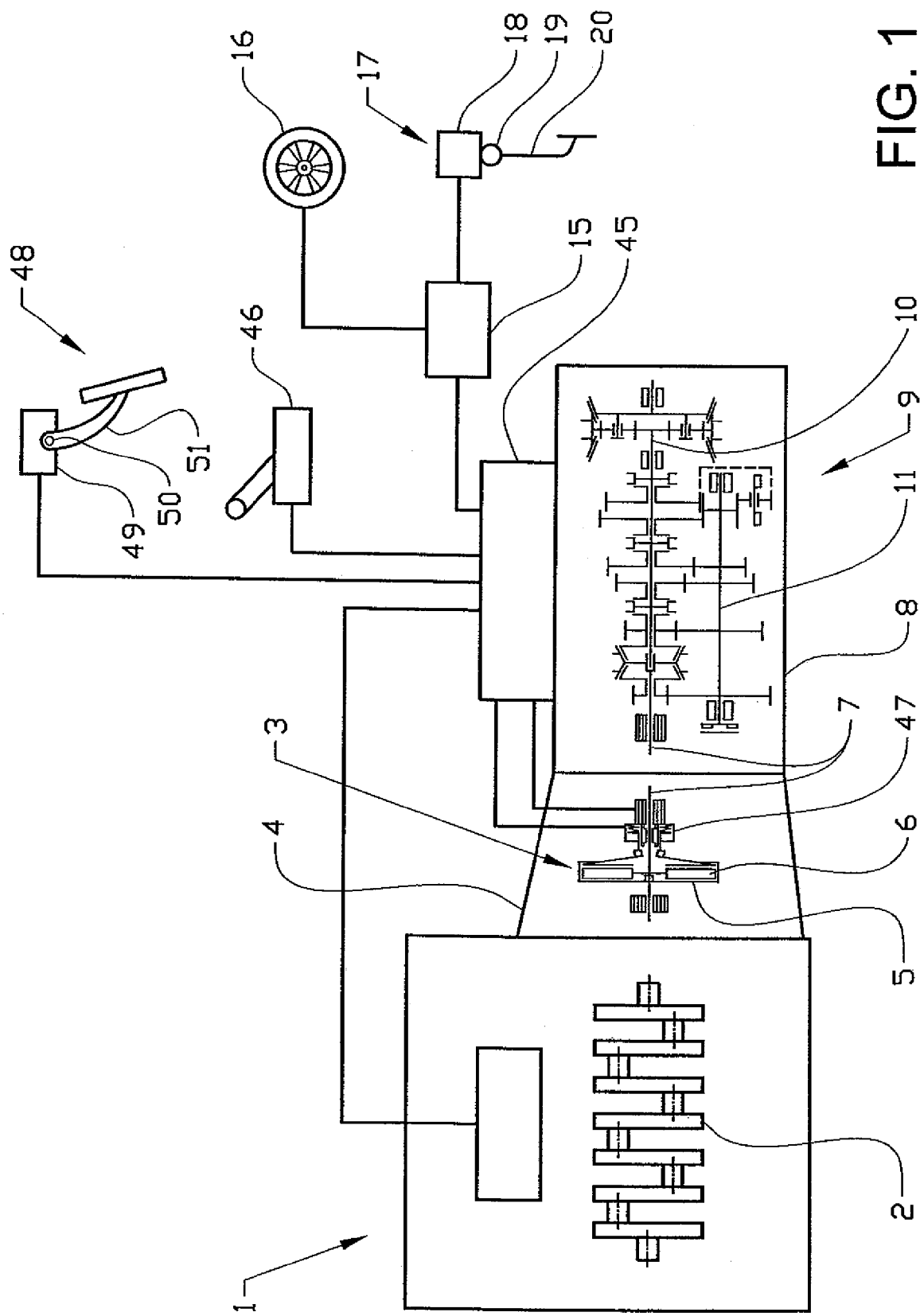
FIG. 1 in schematic drawing showing an embodiment of a brake control-regulated clutch coupling according to the invention arranged between engine and automatic stage-geared gearbox.

In FIG. 1, the reference numeral 1 denotes a six-cylinder internal combustion engine, for example a diesel engine, the crankshaft 2 of which is coupled to a single-plate dry multi-disk clutch coupling generally denoted by 3, which is enclosed in a clutch cover 4. The crankshaft 2 is rotationally fixed to the clutch housing 5 of the clutch 3, while the plate 6 thereof is rotationally fixed to an input shaft 7, which is rotatably supported in the housing 8 of a gearbox generally denoted by 9. A main shaft 10 and an intermediate shaft 11 are also rotatably supported in the housing 8.

Servo devices (not shown) in the gearbox, which engage and disengage the various gears in the gearbox 9, are controlled by an electronic control unit 45 as a function of signals fed into the control unit and representing various engine and vehicle data, which cover at least the engine speed, the vehicle speed, the position of the vehicle throttle lever 48 and, where appropriate, the engine brake on/off, when an electronic gear selector 46 coupled to the control unit 45 is in its automatic shift position. The control unit 45 comprises, among other things, a microprocessor. In the embodiment shown, the throttle lever 48 is an accelerator pedal, but it may feasibly also be some form of manual control, for example. The position of the throttle lever is obtained from an angular position sensor 49, which is coordinated with the pedal arm 51 of the throttle lever 48 pivotally mounted on a shaft 50. When the gear selector 46 is in the manual shift position, gear changing is performed at the driver's command via the gear selector 46. The control unit 45 also controls the fuel injection, that is to say the engine speed, as a function of the throttle lever position and the air admission to a pneumatic piston-cylinder arrangement 47, by means of which the clutch 3 is controlled.

When changing gear from the control unit 45, the position of the automatic clutch 3 is controlled by means of information on the position of the throttle lever 48, the engine speed, engine torque and the position of the clutch 3, so that a smooth, comfortable function is obtained.

The control unit 45 also receives signals relating to the status of the brake system from the vehicle brake control unit 15. The brake control unit 15 controls service brakes 16 of the vehicle as a function of the position of a brake control generally denoted by 17. The position of the brake control is obtained from an angular position sensor 18, which is coordinated with the pedal arm 20 of the brake control 17 pivotally supported on a shaft 19. In the embodiment shown, the brake control 17 is a brake pedal, but it may feasibly also be some form of manual control.

Figure 2:
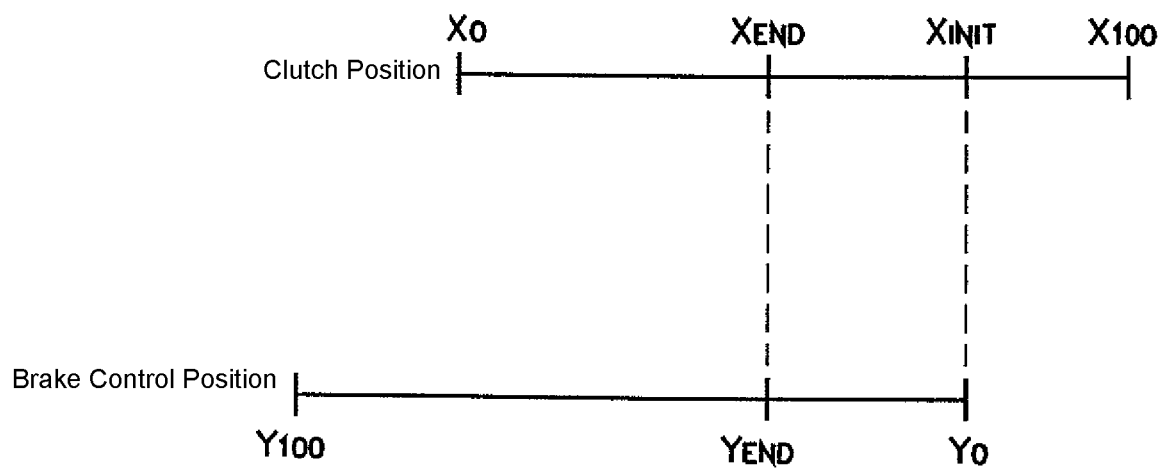
FIG. 2 illustrates different operating ranges of the clutch coupling and the brake control and the relationship between these according to one embodiment of the invention.

According to the invention, the control unit 45 is programmed so that a control function is activated when the said clutch coupling 3 is controlled via the brake control 17, in response to an input signal indicating that the throttle lever 48 is fully eased off (that is to say there is no demand for fuel to the engine 1), the brake control 17 is fully released (that is to say no brake force is required) and a gear is engaged, that is to say the clutch 3 is fully engaged and is transmitting all motive force delivered by the engine 1 to the gearbox 9. In a preferred embodiment of the invention, the brake control 17, in the first 20% of the overall operating range of the brake control, for example, functions as a clutch control. FIG. 2 shows the overall operating range of the brake control 17, $y_0 \leq y \leq y_{100}$, and a first operating range, $y_0 \leq y < y_{END}$, with the clutch function according to the invention. By means of a driver adjustment in the first operating range, $y_0 \leq y < y_{END}$, the speed of the vehicle can be controlled even in the case of speeds lower than are possible for the vehicle at idling speed of the engine 1 and with the lowest gear engaged. By means of the brake control 17, the driver can therefore progressively disengage the clutch coupling 3 to a greater or lesser degree within the first operating range. By disengaging more, that is to say a position of the brake control is selected closer to $y_{END}$, the speed of the vehicle is reduced, since less motive force is transmitted to the gearbox, and, conversely, when a position is selected which is closer to $y_0$. The present invention therefore extends the total controllable speed range of the vehicle.

When the driver selects a position of the brake control 17 which is outside the first operating range, that is to say $y_{END} \leq y \leq y_{100}$, the control unit 45 is programmed in such a way that the function of the brake control 17 assumes control of the service brakes 16 of the vehicle. The service brakes thus begin to act in a position of the brake control immediately outside $y_0 \leq y < y_{END}$. The service brakes are continuously controlled in the usual way up to y100 when the maximum brake force is obtained.

The degree of engagement of the clutch coupling 3 may be divided into multiple different levels or positions. In FIG. 2, $x_0$ denotes the fully disengaged position and $x_{100}$ denotes the fully engaged position. The overall operating range of the clutch may thus be denoted by $x_0 \leq x \leq x_{100}$. $X_{END}$ denotes any of the positions where the clutch coupling just attains a 100% slip or a traction position. $x_{INIT}$ denotes any of the positions where the clutch coupling just attains 0% slip or just begins to slip.

The position when the clutch coupling just attains 100% slip means that the clutch coupling just transmits a motive force from the engine 1 to the gearbox 9 which is barely sufficient to propel the vehicle forward. On a level surface with normal rolling resistance and dead calm wind speed, the vehicle will therefore gradually come to a standstill.

The traction position $x_{END}$ is the position of the clutch 3 when it is transmitting so much motive force from the engine 1 to the gearbox 9 that the vehicle can just begin to move forward. A known method of identifying the traction position is shown, for example, in SE 9903117-1. A typical value for the traction position $x_{END}$ is a position which transmits approximately 20 Nm.

The position when the clutch coupling just attains 0% slip means that the clutch coupling just ceases to slip. Consequently all motive force is transmitted from the engine 1 to the gearbox 9. In the position where the clutch coupling just begins to slip, a slight proportion of the motive force from the engine 1 is therefore lost.

The relative positions of $x_{END}$ and $x_{INIT}$ and their position in relation to the limit positions $x_0$ and $x_{100}$ vary as a function, for example, of the vehicle mass, the road gradient and the like.

In a preferred embodiment of the invention, the position $y_0$ of the brake control 17 is selected so that it corresponds to the position $x_{INIT}$ of the clutch coupling 3, and the position $y_{END}$ so that it corresponds to $x_{END}$ (see dashed lines in FIG. 2). $x_{INIT}$ and $x_{END}$ can, as stated above, each be defined in at least two different ways. The definitions according to the above can be said to utilize the first operating range to the full, that is to say the sensitivity when the driver alters the position of the brake control 17 within the first operating range is relatively high. Somewhat better sensitivity is obtained, however when $x_{INIT}$ is set to a position where the clutch coupling just attains 0% slip and $x_{END}$ is set to a position where the clutch coupling just attains 100% slip. In an alternative embodiment of the invention the position $y_0$ of the brake control 17 is selected so that it corresponds to the position $x_{100}$ of the clutch coupling 3. This affords a simpler solution since it is easier to identify the position $x_{100}$.

The control unit 45 is preferably programmed so that it disengages the clutch coupling 3 when the brake control 17 is depressed past the first operating range $y_0 \leq y < y_{END}$ in order to prevent the engine being throttled to the point that it stalls.

The size of the overall operating range of the brake control controlling the clutch coupling may be arbitrarily selected. The first operating range $y_0 \leq y < y_{END}$ is preferably selected such that it represents 20% of the overall operating range $y_0 \leq y \leq y_{100}$ of the brake control.

The transfer function for transferring the position of the brake control to positions of the clutch coupling is preferably linear, so that the clutch position in the interval $x_{INIT} \leq x < x_{END}$ is proportional to the current position of the brake pedal in the interval $y_0 \leq y < y_{END}$. Another possible transfer function is that a position of the brake control in the first operating range corresponds to a certain transmitted torque. The clutch coupling is therefore controlled until the correct torque is transmitted. Other transfer functions can naturally also be used.

The invention is not limited to the lowest forward gear of the vehicle but can also be used on all gears in the gearbox including reverse gears.

The functions of the control unit 45 may be performed by two or more control units.

The gear position sensors may be sensors arranged directly in the gearbox or they may be indirect, that is to say the gear engaged is determined by the ratio between the rotational speed on the output shaft of the engine 1 and that of the gearbox 9.

What is claimed is:

1. A control method in a vehicle, said method comprising:
   controlling a clutch coupling (3) via a brake control (17) in a vehicle, said clutch coupling (3) having as a primary function to transmit motive force from an internal combustion engine (1) of the vehicle to an automatic stage-geared gearbox (9) arranged in the vehicle and said brake control (17) having as a primary function to control service brakes (16) of the vehicle;
   activating a control function, at zero throttle opening and with a gear engaged and no brake force required, thereby controlling said clutch coupling (3) via the brake control (17);
   making a determination of a position of the clutch coupling (3) upon attaining one of (a) 100% slip and (b) a traction position ($x_{END}$);
   making a determination of a position of the clutch coupling (3) upon attaining one of (a) 0% slip and (b) slip initiation ($x_{INIT}$) and (c) a fully engaged position ($x_{100}$);
   making a determination of a first operating range ($y_0 \leq y < y_{END}$) of the brake control (17) with a lower limit ($y_0$) and an upper limit ($y_{END}$), in which first operating range ($y_0 \leq y < y_{END}$) the clutch coupling (3) is controlled via the brake control (17) and in which the lower limit ($y_0$) corresponds to the position where the clutch coupling begins to slip and the upper limit ($y_{END}$) corresponds to the traction position; and
   controlling the clutch coupling (3) via the brake control (17) when the brake control is in the first operating range and in which the clutch coupling is controlled as a function of the position of the brake control, the traction position ($x_{END}$) and one of (a) fully engaged position ($x_{100}$) and (b) the position where the clutch coupling begins to slip ($x_{INIT}$).

2. The method as recited in claim 1, wherein the brake control (17) assumes a position outside the first operating range, the control function is deactivated when the said clutch coupling (3) is controlled via the brake control, so that the brake control assumes control of the service brakes (16).

3. The method as recited in claim 1, wherein the first operating range extends over a smaller part of the overall operating range of the brake control (17), the said lower limit ($y_0$) of the first operating range commencing in the same position of the brake control which corresponds to the rest position when the brake control controls the service brakes (16) of the vehicle.

4. The method as recited in claim 1, wherein one of the following conditions exist: (a) positions in the first operating range ($y_0 \leqq y < y_{END}$) have a linear relationship to positions of the clutch coupling (3) and (b) each position in the first operating range corresponds to a predetermined torque transmitted by the clutch coupling and has a non-linear relationship to positions of the clutch coupling.

5. A device in a brake control regulated clutch coupling (3) for transmitting motive force from an internal combustion engine (1) arranged in a vehicle to an automatic stage-geared gearbox (9) arranged in the vehicle, the device comprising:
- a brake control (17) that controls service brakes (16) of the vehicle;
- a control unit (45) having at least a brake control function and a clutch coupling control function;
- a brake control position sensor (18);
- a throttle lever position sensor (49) for a throttle lever (48) arranged in the vehicle;
- a gear position sensor, and wherein all of said position sensors are communicatively coupled to the control unit (45) so that in response to input signals indicating zero throttle opening, that a gear is engaged and no brake force is required, the control unit (45) activates a control function for controlling said clutch coupling (3) via the brake control (17) and wherein the control unit (45) controls said clutch coupling (3) via the brake control (17) in a first predetermined operating range ($y_0 \leqq y < y_{END}$) of the brake control, the first operating range extending over a smaller part of the overall operating range ($y_0 \leqq y < y_{100}$) of the brake control (17) and the lower limit ($y_0$) of the first operating range commencing in the same position of the brake control (17) which corresponds to the rest position when the brake control (17) controls service brakes (16) of the vehicle.

6. The device as recited in claim 5, wherein the control unit (45) deactivates the control of the clutch coupling (3) via the brake control (17) when the brake control is outside ($y_{END} \leqq y \leqq y_{100}$) said first operating range ($y_0 \leqq y < y_{END}$), in order to control the service brakes (16) via the brake control (17) outside the said first operating range.

7. The device as recited in claim 5, wherein the upper limit ($y_{END}$) of the first operating range corresponds to at least one of the following clutch coupling positions: (a) attainment of 100% slip (b) attaining a traction position ($x_{END}$) and that the lower limit ($y_0$) of the first operating range corresponds to any fully engaged position ($x_{100}$) of the clutch coupling positions and (c) attainment of 0% slip and (d) the initiation of slip ($x_{INIT}$).

8. The device as recited in claim 5, wherein the positions in the first operating range ($y_0 \leqq y < y_{END}$) have a linear relationship to positions of the clutch coupling (3).

9. The device as recited in claim 5, wherein each position in the first operating range corresponds to a predetermined torque transmitted by the clutch coupling and has a non-linear relationship to positions of the clutch coupling.

* * * * *